June 30, 1964   H. ERDMANN   3,138,854
COMBINATION RETAINING-RING DISPENSING AND APPLYING MEANS
Filed Dec. 15, 1960   7 Sheets-Sheet 1

INVENTOR
HANS ERDMANN
BY
ATTORNEY

June 30, 1964     H. ERDMANN     3,138,854
COMBINATION RETAINING-RING DISPENSING AND APPLYING MEANS
Filed Dec. 15, 1960     7 Sheets-Sheet 3

INVENTOR
HANS ERDMANN
BY
ATTORNEY

June 30, 1964  H. ERDMANN  3,138,854
COMBINATION RETAINING-RING DISPENSING AND APPLYING MEANS
Filed Dec. 15, 1960  7 Sheets-Sheet 4

INVENTOR
HANS ERDMANN
BY
ATTORNEY

June 30, 1964  H. ERDMANN  3,138,854
COMBINATION RETAINING-RING DISPENSING AND APPLYING MEANS
Filed Dec. 15, 1960  7 Sheets-Sheet 7

INVENTOR
HANS ERDMANN
BY
ATTORNEY

United States Patent Office 3,138,854
Patented June 30, 1964

3,138,854
COMBINATION RETAINING-RING DISPENSING
AND APPLYING MEANS
Hans Erdmann, Maplewood, N.J., assignor to Waldes
Kohinoor, Inc., Long Island City, N.Y., a corporation
of New York
Filed Dec. 15, 1960, Ser. No. 76,007
Claims priority, application Great Britain Mar. 25, 1960
17 Claims. (Cl. 29—211)

This invention relates to improvements in combination retaining-ring dispensing and applying means, and more particularly to an improved device for dispensing open retaining rings and applying them to grooved shafts or similar workpieces whereon they serve as an artificial shoulder for locating a machine part assembled on said shaft.

The ever-increasing use of such retaining rings in practically all branches of industry calls for a ring dispensing and applying means which does its work quickly and accurately and with a minimum of movements, and which at the same time is simple and relatively inexpensive in construction, employs comparatively few parts, and is thoroughly dependable in its operation.

Accordingly, a major object of the present invention is the provision of a combination open retaining-ring dispensing and applying device capable of satisfying the need therefor as explained above and which combines in simple, effective and dependable manner a means for storing a plurality of the open retaining rings to be dispensed in column formation, and a means for dispensing said rings one at a time, for positively transferring each individual ring when dispensed to a position adjacent the shaft or other workpiece and in the plane of the groove thereof, and finally for forcing each said ring into its groove to a fully assembled position therein.

A more particular object of the invention is the provision of an improved combination open retaining-ring dispensing and applying device as aforesaid characterized by a swinging-arm type of means for picking off the endmost ring of the column thereof conditioned for dispensing and for transferring said ring to a position which may be closely adjacent to and in the plane of the groove of the shaft or other workpiece to receive same, and finally of forcing said ring into said groove whereupon it secures itself to the groove bottom.

Yet another object of the invention is to provision of a combination open retaining-ring dispensing and applying device employing a swinging-arm type of ring pick-off, transfer and applying means as aforesaid, characterized by a basic design which lends the device to either power or hand operation, depending on the particular requirements which the device is called upon to meet in use.

The above and other objects and advantages of an improved combination open retaining-ring dispensing and applying device according to the present invention will be understood from the following detailed description thereof, in which reference is had to the accompanying drawings illustrating both power and hand operated forms of the device, wherein—

Referring to FIGS. 1–6 illustrating an automatic or power operated form of device according to the invention, such comprises a base plate 10 which mounts an elongated sub-base or block member 11 and spaced longitudinally therefrom a fixture 12, the latter being shown as holding a workpiece in the form of a shaft 13 having a groove 14 adjacent one end thereof, in which latter a retaining ring is to be seated so that it may serve as a locating shoulder for a machine part 15 disposed on said shaft.

Mounted on the block 11 is a dispenser 17 and an applicator 18. Preferably, the dispenser comprises a stack rod 19 extending in generally upright relation with respect to the base 10 and on which a plurality of the open retaining rings to be dispensed are arranged in column formation. Illustratively, the stack rod 19 is affixed at its upper portion to a bracket 20 and said bracket is in turn secured, by means of an angled foot flange 20a provided thereon and screws 21, 21a, to a fixed horizontal table member 22 which is carried by the block 11 in a relatively elevated position. The screws 21, 21a serve also to secure two plate members 23, 24 against the top face of the table 22. Of these plates, the lower plate 24 is provided with a forwardly extending protrusion 24a adapted to form a rest for the column of rings disposed on the stack rod 19, and the upper plate 23 is provided in its front edge with a recess 23a (FIG. 1).

Figures 2, 3:
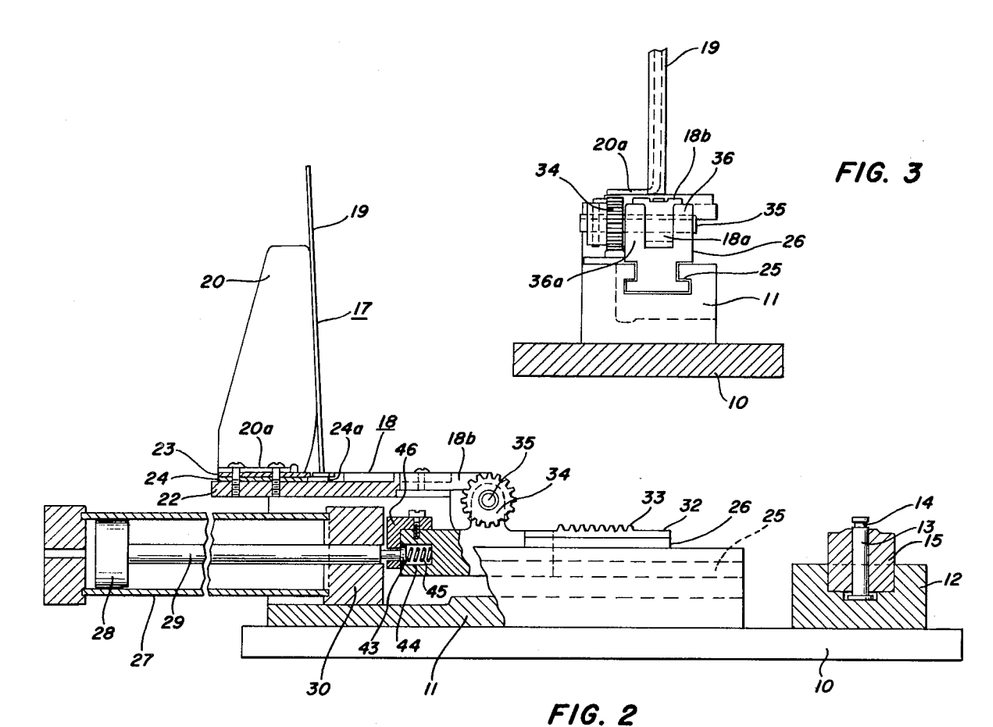
FIG. 2 is a side view thereof partly in section.
FIG. 3 is a section taken along line 3—3 of FIG. 1.

As best seen in FIG. 3, the block 11 has a dove-tail guideway 25 cut or otherwise provided therein to open through its top face, in which a complementally shaped slide portion of a carriage 26 is received, said carriage being thus arranged for reciprocating movement across the top face of the block 11. Reciprocating movement is imparted to the carriage 26 by a preferably double-acting pneumatic power cylinder 27, whose piston 28 drives the piston rod 29 which is guided in an opening in the cylinder end plate 30 and is connected at its forward end to said carriage.

The aforesaid block 11 also mounts on its top face and sidewardly with respect to the path of carriage movement a rack 32 provided in its top surface with a plurality of teeth 33 adapted to mesh with the teeth of a pinion 34. This pinion is keyed or otherwise rigidly secured to an end of a stub shaft 35 journaled in bearings 36, 36a which are rigidly connected to or unitary with the carriage 26 (see FIG. 3). Also keyed or otherwise fast on the stub shaft 35 is a hub 18a which fits between said bearings and is integral with or otherwise rigid with one end of an applicator attaching arm 18b. It is contemplated that the number and disposition of the rack teeth 33 and meshing pinion teeth will be such that, as the pinion is reciprocated over the rack, the aforesaid applicator 18 will be swung throughout an angle of about 180° from a horizontal position in which it closely overlies the table 22 from and to a second horizontal position in which it is generally aligned with the groove 14 of the shaft 13 held with the fixture 12. It is to be noted that, consequent to the rack teeth 33 being provided only in the relatively short-length central portion of the path of movement of the pinion 34, swinging movement is imparted to the applicator 18 only after the arm has moved an appreciable distance in horizontal direction away from the stack rod 19 or the shaft 13, depending on the direction that the carriage is moving. Stated otherwise, the applicator 18 has rectilinear movement in addition to its arcuate swinging movement, with the swinging movement of the applicator taking place only after the applicator has partaken of rectilinear movement toward and away from the stack rod, and similarly toward and away from the shaft 13 in which ring assembly is to be effected.

Figure 1:
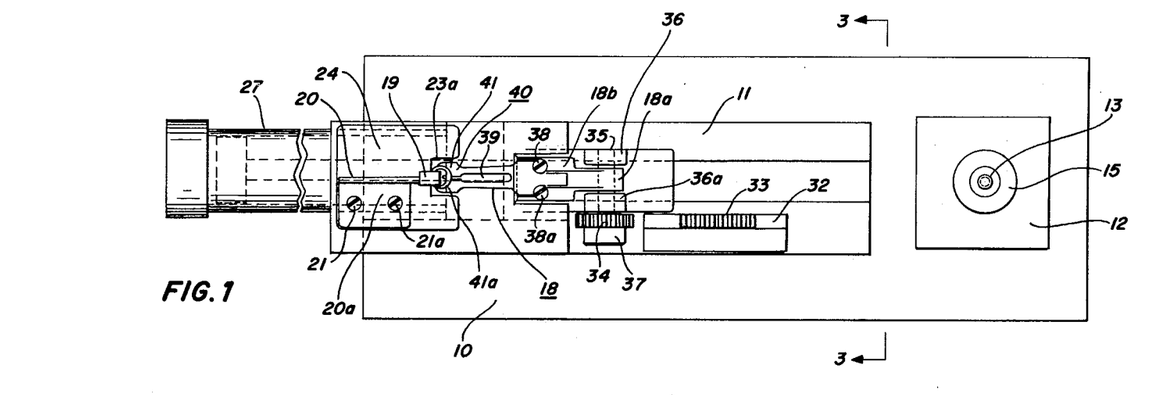
FIG. 1 is a plan view of a so-called automatic or power operated form of combination ring dispensing and applying device as herein proposed.

As best seen in FIG. 1, the applicator 18 proper is preferably similar to that disclosed and claimed in patent to Brell No. 2,483,379, dated September 27, 1949, and comprises an attaching end which is securely affixed as by screws 38, 38a to said attaching arm 18b, an intermediate shank portion which is forked by a slot 39, and a working end 40 comprising resiliently interconnected jaws 41, 41a, together defining a substantially semi-circular ring-receiving cut-out opening through its forward edge and having a radially inward backing flange 42 which supports the ring against axial movement in one direction through the cut-out while it is being held along its outer edge by the spring pressure of the jaws 41, 41a. At this point, it is explained that the applicator 18 is affixed to its attaching arm 18b in position such that its flange 42 faces or is downwardly disposed when the applicator moves rectilinearly over the table 22. This means, of course, that, when the applicator is swung 180° by virtue of engagement of pinion 34 with rack teeth 33, it is turned or inverted so that its backing flange 42 is upwardly disposed, as is intended to be illustrated in FIG. 4. Also to be understood is that, while the aforesaid projection 24a of the plate 24 is dimensioned so as to be capable of supporting the column of rings thereon, it will nevertheless be sized so as to be able to enter the substantially semi-circular cut-out in the working end of the applicator 18, whereby the latter is enabled to move against and grasp the endmost ring of the column on the stack rod 19 without such movement being impeded by said projection 24a. Furthermore, the thickness of the plate 24 and its projection 24a will correspond to the thickness of the backing flange 42 of the applicator, and thus movement of the working end of the applicator into gripping or grasping engagement with said endmost ring will again not be impeded by said projection 24a. Finally, it is to be observed that the lower end of the stack rod terminates a slight distance above the top face of said projection 24a, whereby if made flexible its lower end is free to flex rearwardly if and when pushed by the ring next above the endmost ring with movement of the applicator into gripping position with said endmost ring.

The operation of the aforesaid device is as follows:

Assuming a supply of rings disposed in column formation on the stack rod 19 and that said column is resting on the projection 24a of the plate 24 and hence slightly spaced above the fixed table 22, and also that the applicator 18 has gripped said endmost ring consequent to its rectilinear movement to its extreme lefthand position (responsive to travel of the piston 28 to the left end of the cylinder 27 on the previous stroke of said piston), compressed air is now admitted to said cylinder. Such results in the piston 18 being driven forwardly or to the right and corresponding movement of the carriage 26 and applicator 18 to their rightmost positions illustrated in FIGS. 4 and 5.

Figure 4:
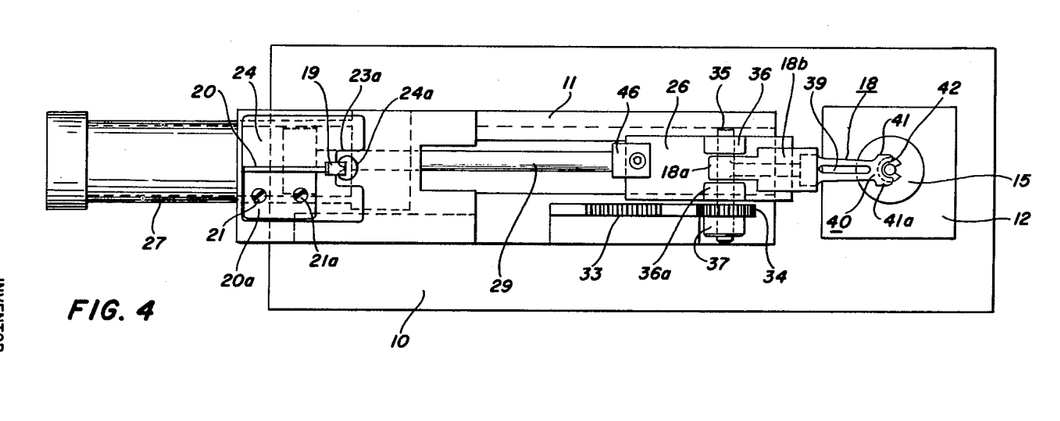
FIGS. 4 and 5 correspond to FIGS. 1 and 2, respectively, but show the device in different operating positions.
Figures 5, 6:
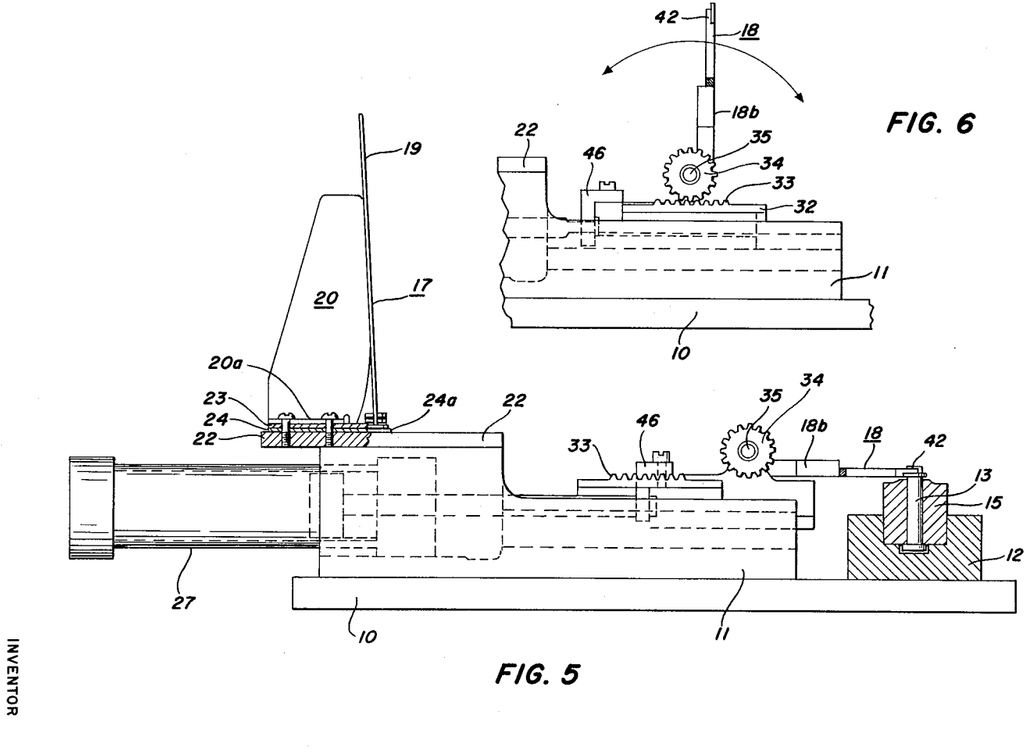
FIG. 6 is a broken-away side view illustrating the applicator in a position intermediate its FIGS. 1, 2 and FIGS. 4, 5 positions.

During the initial portion of this movement, the applicator moving with the carriage 26 partakes of straight-line movement away from the column of rings, and having already gripped the endmost ring thereof, separates said ring from the column and moves it in similarly straight-line direction to the right, thus in effect backing off or retracting said endmost ring from the ring column. However, upon the carriage-mounted pinion 34 engaging with the fixed rack teeth 33, said applicator 18 is swung throughout a 180° clockwise arc as it continues its rightwise movement. By design, upon the applicator reaching its new position, its working end is horizontally aligned with the groove 14 of the shaft 13 against which the applicator continues to move with the carriage 26. Thus, in its final rightwise movement, the applicator forces the ring which it has picked off from the stack rod and transported the horizontal distance between said rod and the shaft 13 into the groove 14 of the latter. As the holding force which the so-assembled ring exerts on the bottom of the shaft groove 14 is greater than the force with which the applicator grips said ring, the applicator will pull away from said ring as it begins its leftwise movement with the carriage 26 consequent to reversal of air pressure within the cylinder 27, and thus the ring is transferred to the shaft.

With air reversal in cylinder 27 as aforesaid, the carriage 26 begins its leftwise movement, such initially withdrawing the applicator from the shaft 13 as aforesaid and later bringing pinion 34 into engagement with the rack teeth 33. When such occurs, the applicator is swung throughout a 180° angle as before, but this time in counterclockwise direction, with the result that the applicator is returned to its initial position as it moves over the table 22. Final movement of the applicator in leftwise direction results in its working end gripping the now endmost ring of the column thereof resting on the plate projection 24a as aforesaid, whereupon the cycle is repeated, such of course assuming that another shaft or workpiece has been mounted in the fixture 12.

To provide for the contingency of the applicator 18 moving against the shaft 13 as aforesaid but misaligned with respect to the shaft groove 14, as might damage the ring intended to be assembled, a yielding connection is provided between the piston rod 29 and the carriage 26. Referring to FIG. 2, such a connection preferably comprises a head 43 formed on the relatively outer end of the piston rod which operates in a bore or recess 44 provided in the adjacent end face of the carriage 26. A relatively stiff coil spring 45 contained within said bore and operative between the blind end thereof and the head 43 of the piston rod normally serves to transmit the thrust of the latter to the carriage 26. However, should movement of said carriage to the right be resisted, as is likely to occur if the applicator 18 presents a ring to the shaft misaligned with respect to the groove 14, the aforesaid spring 45 will yield, thus to permit limited movement of the piston and piston rod without corresponding movement of the carriage 26 and more particularly of the applicator 18 against the shaft 13. A forked member 46 affixed to the end of the carriage adjacent the cylinder 27 and in position to straddle the piston rod rearwardly of its headed end 43 serves as a pull connection between the piston rod and carriage which is effective when the piston and its piston rod move in leftwise direction.

Now referring to FIGS. 7–14, inclusive, illustrating a variant form of retaining-ring dispensing and applying device employing a swing-arm type of applicator as aforesaid, characterized by said applicator being manually actuable rather than power actuated as in the prior described modification, reference numeral 50 generally indicates an open-ended elongated frame member of channel section shown to be turned on its side so that its channel opens sidewardly. More particularly, said frame member 50 comprises top and bottom walls 51, 52, respectively, joined on one side by a vertical side wall 53, and provided along their other side with confronting flanges 54, 55, respectively, which define the side opening. Thus, the frame member 50 is shaped so that it can be easily grasped in the hand, much as a conventional tool handle and further so that it provides an elongated hollow housing.

Contained within the channel or hollow of the frame or handle member 50 is a elongated stack rod 57 affixed to an elongated supporting strap 56 which is in turn preferably secured to the inside face of the bottom wall 52. This stack rod 57 preferably is of T-shaped section thus having a top or cross bar 57a and a vertical leg 57b (FIGS. 11–14), but it serves similarly to the rail-form stack rod 19 of the previously described embodiment to maintain a plurality of rings to be dispensed and assembled in aligned face-to-face engagement and oriented so that the gaps or open sides of the rings face downwardly or toward the supporting strap 56.

Figures 11, 13:
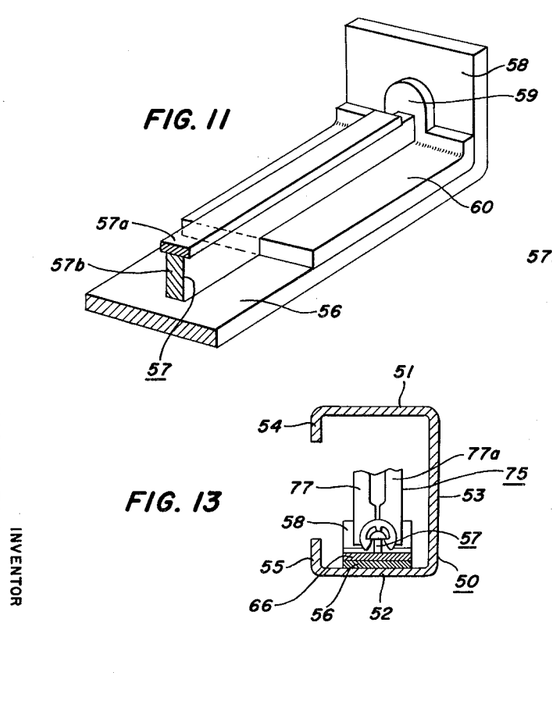
FIGS. 11 and 12 are enlarged, perspective views which illustrate certain details of the stack rod and ring column supporting means, with FIG. 12 further illustrating the working end of the applicator in position to pick off the endmost ring of the column thereof mounted on the stack rod.
FIG. 13 is a section taken along line 13—13 of FIG. 7.
Figure 12:
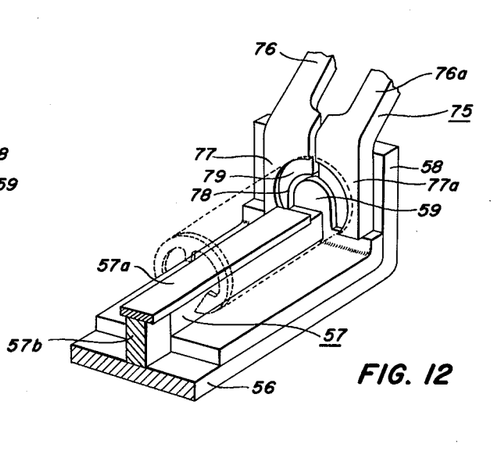
Figure 14:
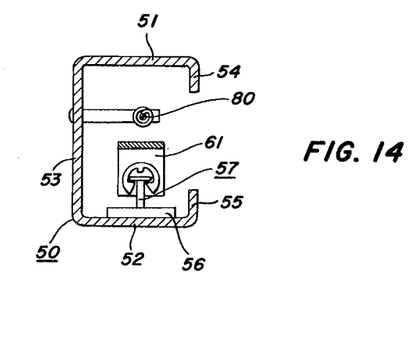
FIG. 14 is a similar section taken along line 14—14 of FIG. 7.

Referring to FIGS. 11 and 12, one end 58 of said supporting strip 56 is bent at a right angle to the strap proper and serves as a fixed abutment or end stop for the column of the retaining rings mounted on the stack rod 57 and which is biased towards said end by spring means to be described. Actually, the endmost ring of said column does not bear directly on the right-angular end 58 of the supporting strap, but instead rests or bears on the right-angular projecting end 59 of a short-length attaching plate 60 affixed to said strap adjacent its angled end 58, and which is disposed flush against the inner face of the latter. FIGS. 11 and 12 also show that, while the vertical leg 57b of the T-shaped stack rod 57 extends directly to said projecting end 59, the cross bar portion 57a of the stack rod terminates short thereof a distance corresponding substantially to the axial thickness of one of the retaining rings maintained on the stack rod. Thus, the endmost ring of the ring stack which is disposed in face engagement with said projecting end 59 may be disengaged or separated from the stack rod by relatively upward movement therefrom, without such movement being impeded by the top bar 57a of said stack rod, as would otherwise occur if said top bar were continued all the way to said projection 59.

Figure 7:
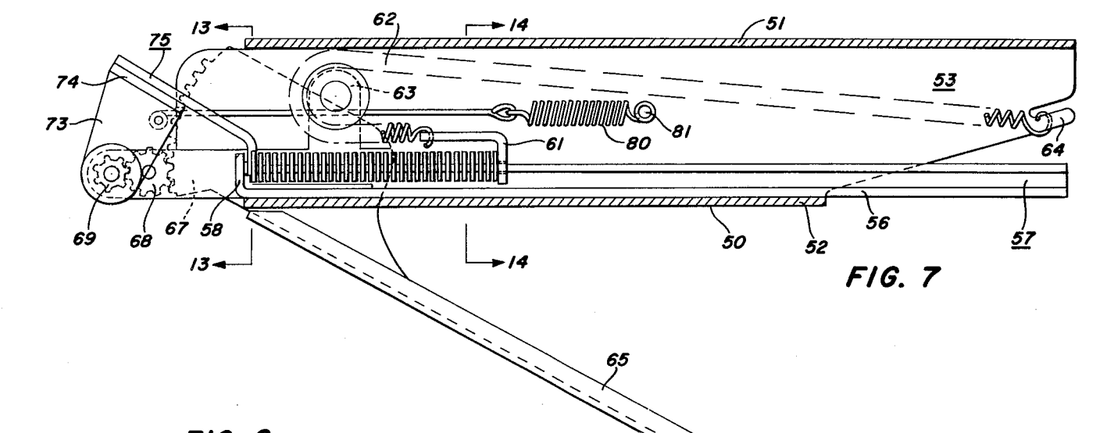
FIGS. 7 and 8 are longitudinal sections through a modified (hand operated) combination ring dispensing and applying device according to the invention, FIG. 7 depicting the operating lever of the device in its normal position of rest, and FIG. 8 showing the lever to have been actuated to its active position.
Figure 8:
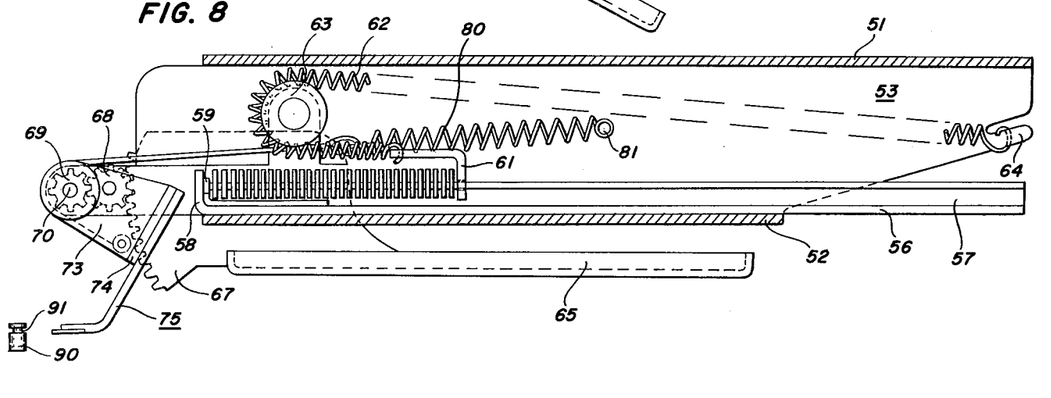

As shown in FIGS. 7 and 8, a follower-type slide member 61 on the stack rod 57 is adapted to urge all rings disposed on the stack rod intermediate itself and the angled end 58 of the strap 56 or, more properly, the aforesaid angled projection 59, against the latter. Illustratively, the slide member 61 is urged toward said projection 59 by a coiled spring 62 affixed at one end to said slide member and being trained over a roller 63 and anchored at its other end to a tongue 64 on an end of the frame 50 remote from the working end thereof.

An operating lever 65 is pivotally connected to the frame 50 as by a pivot pin 66 (FIGS. 9 and 10) which passed through the vertical wall 53 of the frame member adjacent its forward or working end. Said lever 65 at its relatively forward end is formed as a toothed segment 67 whose teeth have meshing relationship with a toothed idling wheel 68, which in turn meshes with a pinion 69 keyed to a shaft 70 rotatably mounted in a bracket 71 affixed to said side wall 53 of the frame member, said bracket also mounting the shaft on which the idling wheel 68 turns as aforesaid. Keyed to the shaft 70 between the bracket 71 and a head 72 of said shaft (FIG. 9) is a swingable arm 73 having a right-angularly disposed flange 74 together serving (like the aforesaid arm 18b of the prior described modification) as an attaching arm for an applicator generally designated 75. As with the aforesaid applicator 18, the appliactor 75 comprises a pair of resiliently connected arms or forks 76, 76a which terminate in arcuate jaws 77, 77a, together defining a substantially semi-circular ring-receiving cut-out 78 which opens through the effectively forward edge of said applicator for receiving and gripping the endmost ring of the column thereof disposed on the stack rod 57, which cut-out is backed by a so-called backing flange 79 comparing to the backing flange 42 of the previously described applicator 18.

Normally, said applicator 75 is held in its rest position in which it is best shown in FIG. 7 by means of a spring 80, one end of which is anchored as by a stud 81 affixed to the wall 53 of the handle 50 and whose other end is formed as an elongated cable affixed to the swingable arm 73. Thus, the spring 80 normally maintains the applicator in its rest position and the lever 65 spread with respect to the handle 50, as shown in FIG. 7. Also, said spring 80 serves to automatically return the handle to its spread position following its movement against the handle, as in FIG. 8.

By the design and relationship of parts, when said lever 65 and applicator 75 are in their rest positions, the toothed idling wheel 68 meshes with teeth of the lever segment 67 at or near one end of said segment, and said applicator is in its ring gripping or pick-off position (FIGS. 7 and 12), in which its working end comprised by the jaws 78, 78a extends into the handle interior and grippingly engages the endmost ring of the column thereof on the stack rod 57, then resting or abutting the aforesaid projection 59 of the plate member 60. At this point, it is explained that the thickness of said projection corresponds to the thickness of the backing flange 79 of the applicator, and thus the projection insures free movement of the working end of the applicator to a position in which it edge-grips said endmost ring, without such movement being impeded by engagement of said backing flange 79 with said ring. Of course, as seen in FIG. 12, said projection 59 is sized so as to be able to enter the cut-out of the applicator, while at the same time to support said endmost ring spaced from the upturned end 58 of the strap 56. In short, the projection 59 functions similarly to the projection 24a of the prior described embodiment.

Figure 9:
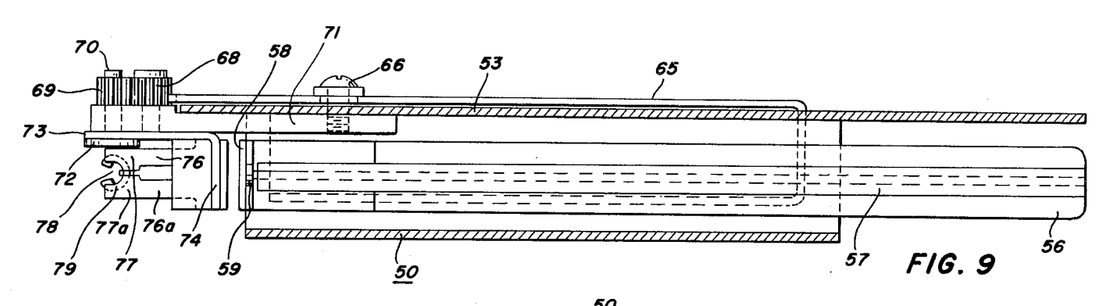
FIG. 9 is a part-sectional top view of the device shown in FIGS. 7 and 8.
Figure 10:
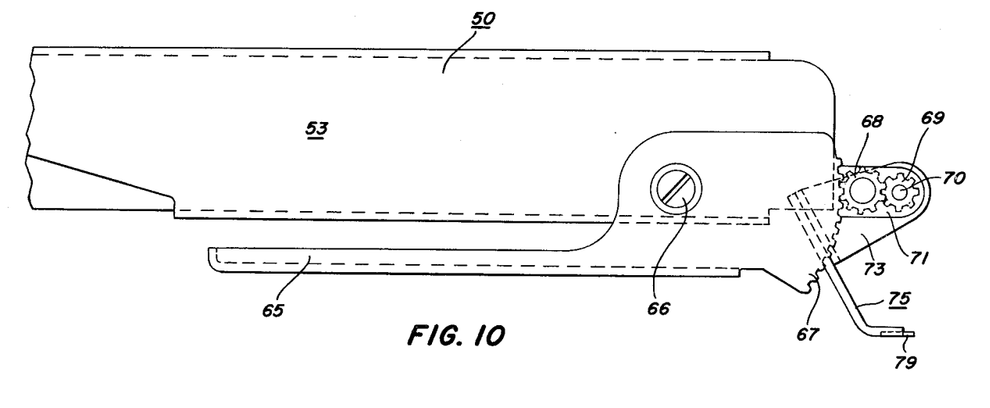
FIG. 10 is an enlarged, broken-away side view of the device depicting the applicator in its position according to FIGS. 8 and 9.

However, when the lever 65 is manually pressed against the action of the spring 80 against the frame 50 so as to assume the position shown in FIGS. 8, 9 and 10, the toothed-segment end 57 of the lever is rotated, thereby in turn to rotate the toothed wheel 68 and the pinion 69 and thereby the applicator blade 75 throughout an angle determined by the angular relationship of the parts, which in the illustrated device is an angle of about 240°, during the initial portion of which angular movement the applicator blade effects retraction of the endmost ring which it has gripped from the column thereof. When the applicator has been swung throughout said 240° angle, the device as a whole can be moved by hand to a position adjacent a workpiece 90 provided with a groove 91 in which the ring gripped by the applicator can be assembled by final movement of the applicator against said workpiece.

Upon release of the operating lever 65, it of course returns to its normal or "at rest" position according to FIG. 7 under the urge of spring 80, such resulting in reverse movement of the applicator 75 throughout a 240° angle arc, as effects re-positioning of the applicator in its normal or "at rest" position. In finally moving to said position, the working end of the applicator will grip the next endmost ring of the column thereof mounted on the stack rod 57, which has moved to the endmost position under the urge of spring 62 acting on the slide or follower 61.

Figure 15:
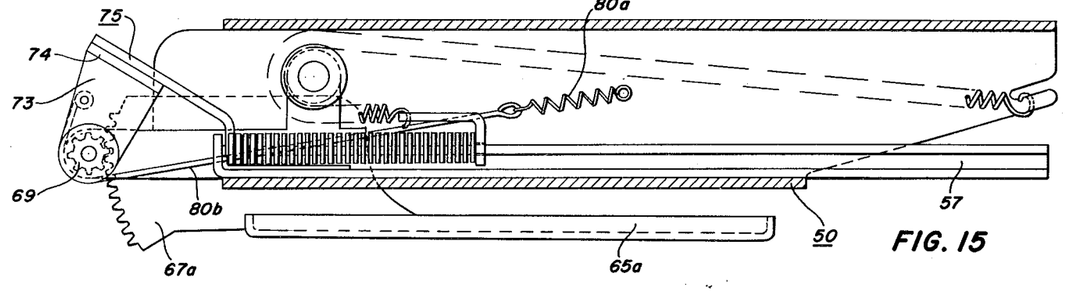
FIGS. 15 and 16 are views which correspond generally to FIGS. 7 and 8 but illustrate another form of hand operated combination ring dispensing and applying device as herein proposed.
Figure 16:
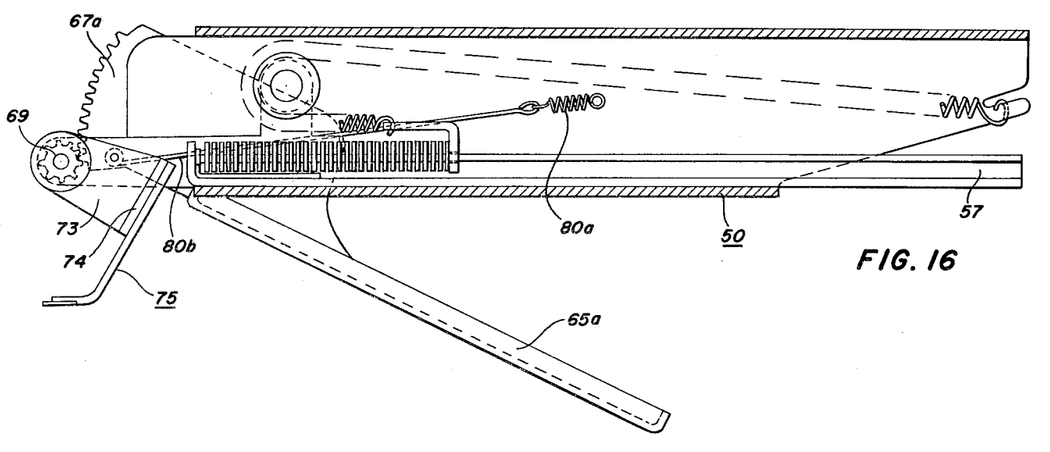

The variant form of hand-operated device illustrated in FIGS. 15 and 16 differs from the just described device in that it is set up and arranged to provide that movement of the swing-arm type applicator from its ring-applying position to its ring pick-off position is effected by swinging movement of the operating lever from its rest position (spread with respect the handle) to a closed position against said handle. Such arrangement has the advantage that the operation of picking-off the endmost ring of the stack thereof is effected by hand pressure on the operating lever, rather than depending on the force of a spring comparing to the spring 80 of the FIGS. 7–14 embodiment, and thus ring pick-off is independent of any such a spring and hence without any requirement for a strong spring as was necessary to effect the ring pick-off operation by the FIGS. 7–14 applicator-dispenser.

More particularly, the FIGS. 15 and 16 form of device comprises an open-ended combined frame member and handle 50, a stack rod 57 and a pivoted swing-arm type of applicator 73, 74, 75, corresponding to the like-numbered parts of the already-described FIGS. 7–14 form. A pivoted operating lever 65a comparing to the aforesaid lever 65 of said prior-described form is also provided but it is to be noted that the segmented and toothed end 67a of said lever is extended forwardly by an amount such that its teeth mesh directly with the pinion 69; that is to say, the idler pinion 68 is dispensed with entirely. Also, a spring 80a connected to the applicator arm bracket 73 by its cable end 80b and otherwise comparing to the spring 80, is provided, but said spring 80a is reversed in its action, so that it serves not only to swing the applicator from its ring pick-off position (FIG. 15) to its ring applying position (FIG. 16) but also to swing the operating lever 65a outwardly from the handle to its rest position in which the operator will of course maintain same during the ring push-on or assembly movement of the tool.

Without further analysis, it will be appreciated that a combination retaining-ring dispensing and applying device according to the variant forms thereof which have been disclosed herein satisfies the objectives of such a device as explained in the foregoing. That is to say, both the power and hand operated forms of device employ a swing arm adapted in one position to pick off the endmost ring of a column thereof maintained in the dispenser, and thereupon to transfer the so dispensed ring to a shaft in whose groove the ring is to be assembled in proper position for its assembly in the groove, with one main form of the disclosed device (the power operated form) additionally functioning to actually complete the assembly of the ring in its groove. All forms of the device are essentially simple in construction and operation and are further characterized by a relatively small number of parts and each by a design which insures speedy ring dispensing and assembly with a minimum of movements with the expenditure of a minimum amount of effort.

As many changes could be made in carrying out the above constructions without departing from the scope of the invention, it is intended that all matter contained in the above description or shown in the accompanying drawings shall be interpreted as illustrative and not in a limiting sense.

I claim:

1. A combination retaining-ring dispensing and applying device comprising, in combination, stack rod supporting means, a stack rod affixed to said means and adapted to mount a plurality of open retaining rings to be dispensed in a column movable towards an end of said stack rod, means forming a support for said ring column and permitting separating movement of the endmost ring of the column therefrom, an applicator comprising a blade-like arm having a working end provided with a substantially semi-circular ring-receiving and ring-edge gripping cut-out which opens through the end edge and through both faces thereof and with a flange bounding and extending radially inwardly into said cut-out for a portion of its depth thereby to form a backing flange for a ring received in said cut-out, means mounting said arm for swinging movement in a vertical plane throughout an arc of at least approximately 180° from a first position, in which said endmost ring is received in said cut-out and is backed by said flange from movement through the cut-out in one direction, to a second position in which said arm including its working end and its said backing flange are inverted as compared to their respective first positions, and means drivingly connected to said arm for positively swinging said arm from and to said first position to and from said second position as aforesaid, the construction and arrangement being such that in moving into and from said first position the working end of the arm will edge-grip and bodily withdraw the endmost ring from the stack rod without such movement being impeded by said backing flange engaging the ring next adjacent said endmost ring and that inversion of the working end and the ring backing flange disposes the flange in a position favorable to the applicator applying said ring to a shaft or the like loosely adjacent the end face of a machine part for which said ring is to form a locating shoulder.

2. A combination retaining-ring dispensing and applying device as defined in claim 1, wherein said last means includes a power cylinder, a reciprocable carriage, and rack and pinion means operative responsive to reciprocation of said carriage.

3. A combination retaining-ring dispensing and applying device as defined in claim 1, wherein said last means includes a hand-operated swing lever and toothed segment and pinion means interposed between said lever and arm for swinging the latter as aforesaid responsive to swinging movement of the former.

4. A combination retaining-ring dispensing and applying device as set forth in claim 1, wherein said applicator arm is also mounted to move rectilinearly prior to and following its swinging movement and the means for swinging said applicator arm is also adapted to impart rectilinear movement as aforesaid to said arm.

5. A combination retaining-ring dispensing and applying device comprising, in combination, supporting means, a stack rod affixed to and extending in generally upright relation from said supporting means and adapted to mount a plurality of open retaining rings to be dispensed in a column movable towards said supporting means, means including said stack rod and supporting means for permitting separating movement of the endmost ring of the column therefrom, an applicator adapted in moving into and away from a first position to pick off said endmost ring of the column thereof and in a second position to present said ring to a grooved shaft or the like for assembly thereon, and means for actuating said applicator to and from said positions and for swinging said arm throughout substantially a 180° angle during the course of its movement, said last means including a carriage mounted on said supporting means for reciprocatory travel between end positions establishing the first and second positions of the applicator, means for reciprocating said carriage between its end positions, means mounting said applicator on the carriage both for bodily movement therewith and for swinging movement relative thereto, and means responsive to movement of the carriage throughout an intermediate portion of its travel for swinging the applicator throughout substantially a 180° angle.

6. A combination retaining-ring dispensing and applying device as defined in claim 5, wherein said supporting means also supports means for holding a grooved shaft in position to receive a ring presented to it by the applicator upon the latter moving into its second position as aforesaid.

7. A combination retaining-ring dispensing and applying means as defined in claim 5, wherein said means for swinging the applicator responsive to carriage movement comprises rack and pinion means operative between said applicator mounting means and said supporting means.

8. A combination retaining-ring dispensing and applying means as defined in claim 5, wherein said applicator comprises an arm having a working end formed by a pair of resiliently connected ring grasping and releasing jaws together defining a ring receiving cut-out and having a radial backing flange for preventing a ring received in the cut-out from moving axially through the cut-out in one direction.

9. A combination retaining-ring dispensing and applying means as defined in claim 8, wherein the applicator in its first position aforesaid is turned so that its backing flange is below the ring receiving cut-out and wherein swinging movement of the applicator effects inversion of the applicator whereby in its second position aforesaid its backing flange is disposed above said ring-receiving cut-out.

10. A combination retaining-ring dispensing and applying device as set forth in claim 5, wherein the means for reciprocating said carriage comprises a power cylinder mounted on said supporting means.

11. A combination retaining-ring dispensing and applying device comprising, in combination, an elongated, hollow frame member shaped as a handle, an elongated stack rod affixed to and enclosed within said frame member and adapted to mount a plurality of open retaining rings to be dispensed in a column movable towards an end of said member, means at said end providing an end support for said ring column and permitting separation of the endmost ring of the column therefrom, an applicator adapted in moving into and away from a first position within said frame member to edge-grip and thereupon bodily withdraw said endmost ring in its own plane from the column of rings and in a second position without said frame member to present said ring to a grooved shaft or the like for assembly thereon, means pivotally connecting said applicator to said end of the frame member for swinging movement relative thereto throughout an arc substantially greater than 90°, and lever actuated means including a hand lever pivoted to said frame member for swinging said applicator between said positions as aforesaid.

12. A combination retaining-ring dispensing and applying device as set forth in claim 11, wherein said lever actuated means further include a toothed segment on said lever and pinion means actuable by said segment and operatively connected to the applicator for imparting swinging movement thereto responsive to swinging movement imparted to said lever.

13. A combination retaining-ring dispensing and applying device as set forth in claim 11, wherein said applicator comprises an arm having a working end formed by a pair of resiliently interconnected, ring grasping and releasing jaws together defining a ring-receiving cut-out and said applicator mounting means comprises an actuating arm pivotally connected at one end to the frame member forwardly thereof for swinging movement in response to lever actuation and being fixedly connected at its free end to the other end of the applicator arm.

14. A combination retaining-ring dispensing and applying device as set forth in claim 13, wherein said applicator jaws are provided with a radial backing flange for preventing a ring received in the cut-out from moving axially through the cut-out in one direction and said applicator when in said first position is faced so that said backing flange is disposed on the face of the applicator opposite the ring column, and wherein said applicator swinging means effects swinging movement of the applicator at least sufficient to effect face-inversion of the applicator.

15. A combination retaining-ring dispensing and applying device as set forth in claim 11, wherein said lever actuated means includes said lever pivotally connected intermediate its ends to the frame member for swinging movement relative thereto from and to a rest position in which a free end thereof is spread from the frame member, gear means interposed between the other end of the lever and the applicator for transmitting swinging movement imparted to either one thereof to the other, spring means operative between the frame member and applicator for normally maintaining the lever in its rest position, and means whereby swinging movement of the lever from its rest position effects swinging movement of the applicator from its second to its first position.

16. A combination retaining-ring dispensing and applying device as set forth in claim 11, wherein said lever actuated means includes said lever pivotally connected intermediate its ends to the frame member for swinging movement relative thereto from and to a rest position in which a free end thereof is spread from the frame member, gear means interposed between the other end of the lever and the applicator for transmitting swinging movement imparted to either one thereof to the other, spring means operative between the frame member and applicator for normally maintaining the lever in its rest position, and said spring means being so connected to the applicator as to be also effective to impart swinging movement of the latter to its first position when the lever is released for movement towards its rest position.

17. A combination retaining-ring dispensing and applying device as set forth in claim 11, wherein said lever actuated means includes said lever pivotally connected intermediate its ends to the frame member for swinging movement relative thereto from and to a rest position in which a free end thereof is spread from the frame member, gear means interposed between the other end of the lever and the applicator for transmitting swinging movement imparted to either one thereof to the other, spring means operative between the frame member and applicator for normally maintaining the lever in its rest position, and means whereby swinging movement of the lever from its rest position effects swinging movement of the applicator from its second to its first position as aforesaid, said spring means being so connected to the applicator as to be also effective to actuate the latter to its said second position when said lever is released for movement to its rest position.

References Cited in the file of this patent

UNITED STATES PATENTS

| | | |
|---|---|---|
| 1,594,326 | Richter | July 27, 1926 |
| 2,837,812 | Erdmann | June 10, 1958 |
| 2,840,892 | Erdmann | July 1, 1958 |
| 2,930,114 | Erdmann | Mar. 29, 1960 |
| 3,040,419 | Erdmann | June 26, 1962 |

FOREIGN PATENTS

| | | |
|---|---|---|
| 1,067,346 | Germany | Oct. 15, 1959 |